(12) United States Patent
Su

(10) Patent No.: US 11,034,803 B2
(45) Date of Patent: Jun. 15, 2021

(54) COLOR MASTERBATCH COMPOSITION FOR DARK TEXTILES OR ENGINEERING PLASTICS AND ARTICLE PRODUCED THEREFROM

(71) Applicants: Yiu Fai Lee, Hong Kong (CN); Wen-Yuan Su, Taipei (TW)

(72) Inventor: Wen-Yuan Su, Taipei (TW)

(73) Assignees: Yiu Fai Lee, Hong Kong (CN); Wen-Yuan Su, Taipei (TW)

( * ) Notice: Subject to any disclaimer, the term of this patent is extended or adjusted under 35 U.S.C. 154(b) by 129 days.

(21) Appl. No.: 16/487,090

(22) PCT Filed: Feb. 13, 2018

(86) PCT No.: PCT/IB2018/050864
§ 371 (c)(1),
(2) Date: Aug. 20, 2019

(87) PCT Pub. No.: WO2018/154409
PCT Pub. Date: Aug. 30, 2018

(65) Prior Publication Data
US 2020/0017643 A1    Jan. 16, 2020

(30) Foreign Application Priority Data
Feb. 21, 2017    (TW) .................................. 106105677

(51) Int. Cl.
| | |
|---|---|
| *C08J 3/22* | (2006.01) |
| *D01F 1/04* | (2006.01) |
| *D01F 6/62* | (2006.01) |
| *C08K 5/00* | (2006.01) |
| *C08K 5/23* | (2006.01) |
| *C08K 5/3437* | (2006.01) |
| *C08K 5/3445* | (2006.01) |
| *C08K 5/3447* | (2006.01) |
| *C08K 5/3465* | (2006.01) |
| *C08K 5/3492* | (2006.01) |
| *C08K 3/22* | (2006.01) |
| *C08J 5/24* | (2006.01) |

(52) U.S. Cl.
CPC .................. *C08J 3/226* (2013.01); *C08J 5/24* (2013.01); *C08K 5/0041* (2013.01); *D01F 1/04* (2013.01); *D01F 6/625* (2013.01); *C08J 2367/02* (2013.01); *C08K 5/23* (2013.01); *C08K 5/3437* (2013.01); *C08K 5/3445* (2013.01); *C08K 5/3447* (2013.01); *C08K 5/3465* (2013.01); *C08K 5/3492* (2013.01); *C08K 2003/2241* (2013.01); *D01F 6/62* (2013.01); *D10B 2505/02* (2013.01)

(58) Field of Classification Search
CPC ....... C08J 3/226; C08L 67/00; C08L 2310/00; C08K 5/0041; C09B 67/0033; D01F 6/92; D01F 1/04; D01F 1/06
See application file for complete search history.

(56) References Cited

U.S. PATENT DOCUMENTS

2015/0376412 A1* 12/2015 Harada .............. G03G 9/08726
430/109.2

FOREIGN PATENT DOCUMENTS

| JP | 2006249411 A | * | 9/2006 | |
|---|---|---|---|---|
| JP | 2011118367 A | * | 6/2011 | |
| WO | WO-2015192321 A1 | * | 12/2015 | ............... C09D 5/00 |

OTHER PUBLICATIONS

Google patents translation of JP-2011118367-A (2011, 13 pages).*
Google patents translation of JP-2006249411-A (2006, 12 pages).*
Google patents translation of WO-2015192321-A1 (2015, 11 pages).*

* cited by examiner

*Primary Examiner* — Brieann R Johnston
(74) *Attorney, Agent, or Firm* — Leong C. Lei

(57) ABSTRACT

A color masterbatch composition, comprising a thermoplastic polyester, a yellow colorant component, a red colorant component, and a blue colorant component. The yellow colorant component is selected from Pigment Yellow 147, Pigment Yellow 181, Pigment Yellow 183, Dye Brown 53, or a combination thereof. The red colorant component is selected from Pigment Red 122, Pigment Red 144, Pigment Red 202, Pigment Red 214, or combination thereof. The blue colorant component is selected from Pigment Blue 60, Dye Blue 67, or a combination thereof. The present invention further provides a colloidal particle that is obtained by developing the above masterbatch composition in a base material mainly composed of thermoplastic polyester. An article produced from the present disclosure has an effect of slowing down and reducing heat absorption and can maintain its original color during processing.

4 Claims, No Drawings

COLOR MASTERBATCH COMPOSITION FOR DARK TEXTILES OR ENGINEERING PLASTICS AND ARTICLE PRODUCED THEREFROM

TECHNICAL FIELD OF THE INVENTION

The present invention relates to a color masterbatch composition, and more particularly to a color masterbatch composition for textiles or engineering plastics and an article produced therefrom.

DESCRIPTION OF THE PRIOR ART

Dark textiles are commonly used in clothing, curtains and sofas, and dark engineering plastics are widely used in electrical appliances and automotive components; they have a good shading and dirt avoidance. Generally, the pre-spinning coloring of dark textiles or engineering plastics is obtained by adding carbon black which is easily obtained as a pigment to the raw materials, but the problems of easily absorbing infrared light and causing its products to be rapidly increased in temperature are thus generated.

Taiwan patent TW 1509038 discloses an infrared low temperature-rise pigment composition, capable of reducing the temperature rise caused by the absorption of infrared light by selecting specific pigments to combine. However, it is noted that the plastic films formed by most of the pigment compositions disclosed in the above patents and thermoplastic polyesters cannot maintain the original colors of the pigment compositions after the necessary processing of the textiles or engineering plastics (e.g. heating at 285-300° C.); they must be further dyed after the products are formed, and the dark textiles (post-spinning coloring) or engineering plastics can then be produced such that the processing complexity and wastewater pollution are increased.

SUMMARY OF THE INVENTION

The first object of the disclosure is to provide a color masterbatch composition, capable of overcoming the above shortcomings.

The color masterbatch composition of the disclosure includes thermoplastic polyester, a yellow colorant component, a red colorant component, and a blue colorant component. The yellow colorant component is selected from Pigment Yellow 147, Pigment Yellow 181, Pigment Yellow 183, Dye Brown 53, or a combination thereof. The red colorant component is selected from Pigment Red 122, Pigment Red 144, Pigment Red 202, Pigment Red 214, or a combination thereof. The blue colorant component is selected from Pigment Blue 60, Dye Blue 67, or a combination thereof, the above colorants is expressed in color index common names.

The second object of the disclosure is to provide a colloidal particle, obtained by developing the color masterbatch composition in a base material mainly composed of thermoplastic polyester.

The third object of the disclosure is to provide a fiber, obtained by drawing the above colloidal particle.

The fourth object of the disclosure is to provide a prepreg, obtained by molding the above colloidal particle.

DETAILED DESCRIPTION OF THE PREFERRED EMBODIMENTS

The above and other purposes, features and advantages of the present invention will become apparent with reference to the following detailed description and preferred embodiments.

Unless otherwise defined, all technical and scientific terms used herein have a common understanding among those skilled in the art. Those skilled in the art will recognize many methods and materials similar or equivalent to those described herein, which can be used to implement the present invention. Of course, the present invention is by no means limited by the described methods and materials.

The present disclosure provides a color masterbatch composition, including thermoplastic polyester, a yellow colorant component, a red colorant component, and a blue colorant component. The yellow colorant component is selected from Pigment Yellow 147, Pigment Yellow 181, Pigment Yellow 183, Dye Brown 53, or a combination thereof. The red colorant component is selected from Pigment Red 122, Pigment Red 144, Pigment Red 202, Pigment Red 214, or a combination thereof. The blue colorant component is selected from Pigment Blue 60, Dye Blue 67, or a combination thereof. The present invention further provides a colloidal particle that is obtained by developing the above masterbatch composition in a base material mainly composed of a thermoplastic polyester. The above colorants are expressed according to color index common names.

In some embodiments, the color masterbatch composition may further include titanium dioxide. With the total weight of the color masterbatch component being 100 wt %, the content range of the titanium dioxide can be greater than 0 wt % to 5 wt %.

Examples of thermoplastic polyesters suitable for use in the present disclosure include, but are not limited to, polyethylene terephthalate (PET), polybutylene terephthalate (PBT), functionalized derivatives of PET, functionalized derivatives of PBT, copolymers thereof, or blenders thereof According to the disclosure, the total weight of the color masterbatch composition is 100 wt %, the content of the red colorant component may range from 8 wt % to 15 wt %. The total weight of the color masterbatch composition is 100 wt %, and the content of the yellow colorant component ranges from 7 wt % to 15 wt %. The total weight of the color masterbatch is 100 wt %, and the content of the blue colorant component ranges from 5 wt % to 15 wt %.

In some embodiments, the total weight of the color masterbatch composition is 100 wt %, and the yellow colorant component is dye brown 53 with content ranging from 7 wt % to 10 wt %.

In some embodiments, the blue colorant component is dye blue 67 with content ranging from 5 wt % to 10 wt %.

According to the present disclosure, the color masterbatch composition may also include existing additives such as ultraviolet absorbers, antioxidants, flame retardants, or combinations thereof.

In addition, the present disclosure provides a colloidal particle that is obtained by developing the above masterbatch composition in a base material mainly composed of thermoplastic polyester. The present disclosure also discloses a method for preparing a colloidal particle, including developing the above color masterbatch composition in a base material mainly composed of thermoplastic polyester. In some embodiments, the content of the color masterbatch ranges from 1 wt % to 10 wt %, with the total weight of the colloidal particles being 100 wt %.

According to the disclosure, the thermoplastic polyester in the base material may be the same as or different from the thermoplastic polyester in the above color masterbatch composition.

Furthermore, it is found that processed articles (such as fibers or plastics) made from the above colloidal particles have the effect of slowing down and reducing heat absorption and maintain its original color during the necessary processing to allow them to be conducive to be applied in textiles or engineering plastics, especially dark textiles or engineering plastics.

Therefore, the disclosure also discloses a method for preparing a fiber, including the fiber drawing of the above colloidal particle. The above fiber drawing can be carried out according to the operating conditions conventionally used in the art, for example, 285-300° C.

The disclosure also provides a plastic material which is obtained by molding the above colloidal particle. The disclosure also provides a method for preparing a plastic material, including molding the above colloidal particle. According to the disclosure, the examples of the plastic material include, but are not limited to, a prepreg and thin plastic film.

As used herein, the term "molding" means a method of forming a raw material using a mold or a matrix. Examples of molding methods suitable for the present disclosure include, but are not limited to, injection molding, extrusion molding, compression molding, and rotational molding and similar methods. The molding can be carried out according to the operating conditions conventionally used in the art, for example, 285° C. to 300° C.

The disclosure will be described with reference to the following embodiments, but it should be understood that the embodiments are merely illustrative and not to be construed as limiting.

IMPLEMENTATION EXAMPLES

[Implementation Examples A1 to A32] Color Masterbatch Composition

The colorants were mixed into the pulverized thermoplastic polyester granules according to the content ratio of Table 1 below, and further subjected to extrusion kneading at 240-280° C. in a twin-screw extruder to obtain the color masterbatch compositions of the implementation examples A1 to A32.

TABLE 1

|  | Yellow colorant (content wt %) | Red colorant (content wt %) | Blue colorant (content wt %) | Thermoplastic polyester (content wt %) |
|---|---|---|---|---|
| A1 | pigment yellow 147 (12 wt %) | pigment red 144 (10 wt %) | pigment blue 60 (15 wt %) | PET (63 wt %) |
| A2 | pigment yellow 147 (12 wt %) | pigment red 214 (10 wt %) | pigment blue 60 (15 wt %) | PET (63 wt %) |
| A3 | pigment yellow 147 (12 wt %) | pigment red 122 (10 wt %) | pigment blue 60 (15 wt %) | PET (63 wt %) |
| A4 | pigment yellow 147 (12 wt %) | pigment red 202 (10 wt %) | pigment blue 60 (15 wt %) | PET (63 wt %) |
| A5 | pigment yellow 147 (10 wt %) | pigment red 144 (15 wt %) | dye blue 67 (10 wt %) | PET (65 wt %) |
| A6 | pigment yellow 147 (10 wt %) | pigment red 214 (15 wt %) | dye blue 67 (10 wt %) | PET (65 wt %) |
| A7 | pigment yellow 147 (10 wt %) | pigment red 122 (15 wt %) | dye blue 67 (10 wt %) | PET (65 wt %) |
| A8 | pigment yellow 147 (10 wt %) | pigment red 202 (15 wt %) | dye blue 67 (10 wt %) | PET (65 wt %) |
| A9 | pigment yellow 183 (15 wt %) | pigment red 144 (10 wt %) | pigment blue 60 (15 wt %) | PET (60 wt %) |
| A10 | pigment yellow 183 (15 wt %) | pigment red 214 (10 wt %) | pigment blue 60 (15 wt %) | PET (60 wt %) |
| A11 | pigment yellow 183 (15 wt %) | pigment red 122 (10 wt %) | pigment blue 60 (15 wt %) | PET (60 wt %) |
| A12 | pigment yellow 183 (15 wt %) | pigment red 202 (10 wt %) | pigment blue 60 (15 wt %) | PET (60 wt %) |
| A13 | pigment yellow 183 (15 wt %) | pigment red 144 (10 wt %) | dye blue 67 (5 wt %) | PET (70 wt %) |
| A14 | pigment yellow 183 (15 wt %) | pigment red 214 (10 wt %) | dye blue 67 (5 wt %) | PET (70 wt %) |
| A15 | pigment yellow 183 (15 wt %) | pigment red 122 (10 wt %) | dye blue 67 (5 wt %) | PET (70 wt %) |
| A16 | pigment yellow 183 (15 wt %) | pigment red 202 (10 wt %) | dye blue 67 (5 wt %) | PET (70 wt %) |
| A17 | dye brown 53 (10 wt %) | pigment red 144 (10 wt %) | pigment blue 60 (15 wt %) | PET (65 wt %) |
| A18 | dye brown 53 (10 wt %) | pigment red 214 (10 wt %) | pigment blue 60 (15 wt %) | PET (65 wt %) |
| A19 | dye brown 53 (10 wt %) | pigment red 122 (10 wt %) | pigment blue 60 (15 wt %) | PET (65 wt %) |
| A20 | dye brown 53 (10 wt %) | pigment red 202 (10 wt %) | pigment blue 60 (15 wt %) | PET (65 wt %) |
| A21 | dye brown 53 (8 wt %) | pigment red 144 (15 wt %) | dye blue 67 (8 wt %) | PET (69 wt %) |
| A22 | dye brown 53 (8 wt %) | pigment red 214 (15 wt %) | dye blue 67 (8 wt %) | PET (69 wt %) |
| A23 | dye brown 53 (8 wt %) | pigment red 122 (15 wt %) | dye blue 67 (8 wt %) | PET (69 wt %) |
| A24 | dye brown 53 (8 wt %) | pigment red 202 (15 wt %) | dye blue 67 (8 wt %) | PET (69 wt %) |
| A25 | pigment yellow 181 (15 wt %) | pigment red 144 (10 wt %) | pigment blue 60 (15 wt %) | PET (60 wt %) |
| A26 | pigment yellow 181 (15 wt %) | pigment red 214 (10 wt %) | pigment blue 60 (15 wt %) | PET (60 wt %) |
| A27 | pigment yellow 181 (15 wt %) | pigment red 122 (10 wt %) | pigment blue 60 (15 wt %) | PET (60 wt %) |
| A28 | pigment yellow 181 (15 wt %) | pigment red 202 (10 wt %) | pigment blue 60 (15 wt %) | PET (60 wt %) |
| A29 | pigment yellow 181 (15 wt %) | pigment red 144 (10 wt %) | dye blue 67 (5 wt %) | PET (70 wt %) |
| A30 | pigment yellow 181 (15 wt %) | pigment red 214 (10 wt %) | dye blue 67 (5 wt %) | PET (70 wt %) |
| A31 | pigment yellow 181 (15 wt %) | pigment red 122 (10 wt %) | dye blue 67 (5 wt %) | PET (70 wt %) |
| A32 | pigment yellow 181 (15 wt %) | pigment red 202 (10 wt %) | dye blue 67 (5 wt %) | PET (70 wt %) |

[Implementation Examples B1 to B32] Color Masterbatch Composition

The colorant was added to the pulverized thermoplastic polyester granules according to the content ratio of Table 2 below (95 wt % total), and 5 wt % of titanium dioxide was added, followed by extrusion at 240-280° C. in a twin-screw extruder. The mixture was kneaded to obtain the color masterbatch compositions of implementation examples B1 to B32.

TABLE 2

| | Yellow colorant (content wt %) | Red colorant (content wt %) | Blue colorant (content wt %) | Thermoplastic polyester (content wt %) |
|---|---|---|---|---|
| B1 | pigment yellow 147 (11 wt %) | pigment red 144 (9 wt %) | pigment blue 60 (12 wt %) | PET (63 wt %) |
| B2 | pigment yellow 147 (11 wt %) | pigment red 214 (9 wt %) | pigment blue 60 (12 wt %) | PET (63 wt %) |
| B3 | pigment yellow 147 (11 wt %) | pigment red 122 (9 wt %) | pigment blue 60 (12 wt %) | PET (63 wt %) |
| B4 | pigment yellow 147 (11 wt %) | pigment red 202 (9 wt %) | pigment blue 60 (12 wt %) | PET (63 wt %) |
| B5 | pigment yellow 147 (9 wt %) | pigment red 144 (12 wt %) | dye blue 67 (9 wt %) | PET (65 wt %) |
| B6 | pigment yellow 147 (9 wt %) | pigment red 214 (12 wt %) | dye blue 67 (9 wt %) | PET (65 wt %) |
| B7 | pigment yellow 147 (9 wt %) | pigment red 122 (12 wt %) | dye blue 67 (9 wt %) | PET (65 wt %) |
| B8 | pigment yellow 147 (9 wt %) | pigment red 202 (12 wt %) | dye blue 67 (9 wt %) | PET (65 wt %) |
| B9 | pigment yellow 183 (13 wt %) | pigment red 144 (9 wt %) | pigment blue 60 (13 wt %) | PET (60 wt %) |
| B10 | pigment yellow 183 (13 wt %) | pigment red 214 (9 wt %) | pigment blue 60 (13 wt %) | PET (60 wt %) |
| B11 | pigment yellow 183 (13 wt %) | pigment red 122 (9 wt %) | pigment blue 60 (13 wt %) | PET (60 wt %) |
| B12 | pigment yellow 183 (13 wt %) | pigment red 202 (9 wt %) | pigment blue 60 (13 wt %) | PET (60 wt %) |
| B13 | pigment yellow 183 (12 wt %) | pigment red 144 (8 wt %) | dye blue 67 (5 wt %) | PET (70 wt %) |
| B14 | pigment yellow 183 (12 wt %) | pigment red 214 (8 wt %) | dye blue 67 (5 wt %) | PET (70 wt %) |
| B15 | pigment yellow 183 (12 wt %) | pigment red 122 (8 wt %) | dye blue 67 (5 wt %) | PET (70 wt %) |
| B16 | pigment yellow 183 (12 wt %) | pigment red 202 (8 wt %) | dye blue 67 (5 wt %) | PET (70 wt %) |
| B17 | dye brown 53 (9 wt %) | pigment red 144 (9 wt %) | pigment blue 60 (12 wt %) | PET (65 wt %) |
| B18 | dye brown 53 (9 wt %) | pigment red 214 (9 wt %) | pigment blue 60 (12 wt %) | PET (65 wt %) |
| B19 | dye brown 53 (9 wt %) | pigment red 122 (9 wt %) | pigment blue 60 (12 wt %) | PET (65 wt %) |
| B20 | dye brown 53 (9 wt %) | pigment red 202 (9 wt %) | pigment blue 60 (12 wt %) | PET (65 wt %) |
| B21 | dye brown 53 (7 wt %) | pigment red 144 (12 wt %) | dye blue 67 (7 wt %) | PET (69 wt %) |
| B22 | dye brown 53 (7 wt %) | pigment red 214 (12 wt %) | dye blue 67 (7 wt %) | PET (69 wt %) |
| B23 | dye brown 53 (7 wt %) | pigment red 122 (12 wt %) | dye blue 67 (7 wt %) | PET (69 wt %) |
| B24 | dye brown 53 (7 wt %) | pigment red 202 (12 wt %) | dye blue 67 (7 wt %) | PET (69 wt %) |
| B25 | pigment yellow 181 (13 wt %) | pigment red 144 (9 wt %) | pigment blue 60 (13 wt %) | PET (60 wt %) |
| B26 | pigment yellow 181 (13 wt %) | pigment red 214 (9 wt %) | pigment blue 60 (13 wt %) | PET (60 wt %) |
| B27 | pigment yellow 181 (13 wt %) | pigment red 177 (9 wt %) | pigment blue 60 (13 wt %) | PET (60 wt %) |
| B28 | pigment yellow 181 (13 wt %) | pigment red 202 (9 wt %) | pigment blue 60 (13 wt %) | PET (60 wt %) |
| B29 | pigment yellow 181 (12 wt %) | pigment red 144 (8 wt %) | dye blue 67 (5 wt %) | PET (70 wt %) |
| B30 | pigment yellow 181 (12 wt %) | pigment red 214 (8 wt %) | dye blue 67 (5 wt %) | PET (70 wt %) |
| B31 | pigment yellow 181 (12 wt %) | pigment red 122 (8 wt %) | dye blue 67 (5 wt %) | PET (70 wt %) |
| B32 | pigment yellow 181 (12 wt %) | pigment red 202 (8 wt %) | dye blue 67 (5 wt %) | PET (70 wt %) |

Implementation Examples C1 to C32, D1 to D32] Color Masterbatch Composition

The steps of implementation examples C1 to C32 and D1 to D32 are similar to those of implementation examples A1 to A32 and B1 to B32, respectively. The difference is that PBT replaces PET to prepare the masterbatch compositions of implementation examples C1-C32 and D1-D32, respectively.

Comparative Examples

[Comparative Examples CB, Z1 to Z4] Color Masterbatch Composition

Carbon black (30 wt %) was added to the pulverized thermoplastic polyester granules (70 wt %), and further subjected to extrusion kneading at 240-280° C. in a twin-screw extruder to obtain the color masterbatch composition of comparative example CB. In addition, the colorants were added to the pulverized thermoplastic polyester granules according to the content ratios in Table 3 below, and then subjected to extrusion kneading at 240 to 280° C. in a twin-screw extruder to obtain the color masterbatch compositions of comparative examples Z1 to Z4.

TABLE 3

| | Yellow colorant (content wt %) | Red colorant (content wt %) | Blue colorant (content wt %) | Thermoplastic polyester (content wt %) |
|---|---|---|---|---|
| Z1 | pigment yellow 110 (24 wt %) | pigment red 122 (7 wt %) | pigment blue 60 (9 wt %) | PET (60 wt %) |
| Z2 | pigment yellow 138 (22 wt %) | pigment red 166 (12.8 wt %) | pigment blue 16 (5.2 wt %) | PET (60 wt %) |
| Z3 | pigment yellow 109 (20.8 wt %) | pigment red 166 (10 wt %) | pigment blue 15:3 (9.2 wt %) | PET (60 wt %) |
| Z4 | pigment yellow 120 (20.8 wt %) | pigment red 254 (11.2 wt %) | pigment blue 15:3 (8 wt %) | PET (60 wt %) |

Application Examples

[Application Example 1] PET Colloidal Particle

The color masterbatch compositions of the above implementation examples A1 to A32, B1 to B32, C1 to C32 and D1 to D32 were pelletized and then added to PET for color development (the color masterbatch composition accounted for 6 wt % of the total weight) to obtain the PET colloidal particles $PET_{A1\ to\ A32}$, $PET_{B1\ to\ B32}$, $PET_{C1\ to\ C32}$ and $PET_{D1\ to\ D32}$ of application example 1.

[Application Example 2] Fiber

The PET colloidal particles $PET_{A1\ to\ A32}$, $PET_{B1\ to\ B32}$, $PET_{C1\ to\ C32}$ and $PET_{D1\ to\ D32}$ of above application example 1 were drawn at 285 to 300° C. to obtain fibers $F_{A1\ to\ A32}$, $F_{B1\ to\ B32}$, $F_{C1\ to\ C32}$ and $F_{D1\ to\ D32}$ (the fiber fineness is 3 DPF) of application example 2, where fibers $F_{A1\ to\ A32}$ and $F_{B1\ to\ B32}$ are black, and $F_{C1\ to\ C32}$ and $F_{D1\ to\ D32}$ are dark grey, which can be suitable for dark textiles.

[Application Example 3] Prepreg

The PET colloidal particles $PET_{A1\ to\ A32}$, $PET_{B1\ to\ B32}$, $PET_{C1\ to\ C32}$ and $PET_{D1\ to\ D32}$ of the above application example 1 were shot at 285-300° C. to obtain the prepregs $S_{A1\ to\ A32}$, $S_{B1\ to\ B32}$, $S_{C1\ to\ C32}$ and $S_{D1\ to\ D32}$ of application example 3, where the prepregs $S_{A1\ to\ A32}$ and $S_{B1\ to\ B32}$ are black, and the prepregs $S_{C1\ to\ C32}$ and $S_{D1\ to\ D32}$ are dark gray, which can be applied to dark engineering plastics.

Comparative Application Examples

[Comparative Application Example 1] PET Colloidal Particle

The color masterbatch composition of the above comparative example CB and Z1 to Z4 was pelletized and then added to PET for color development (the color masterbatch composition accounted for 5.5 wt % of the total weight) to obtain the carbon black PET colloidal particles $PET_{CB}$ and black PET colloidal particles $PET_{Z1-Z4}$ of comparative application example 1.

[Comparative Application Example 2] Fibers

The carbon black PET colloidal $PET_{CB}$ of comparative application example 1 and the black PET colloidal particles $PET_{Z1\ to\ Z4}$ of comparative application example 2 were drawn at 285 to 300° C. to obtain fibers $F_{CB}$ and $F_{Z1\ to\ Z4}$ of comparative application example 3, respectively, where the fibers $F_{Z1\ to\ Z4}$ are all faded and close to brown, and cannot be directly applied to dark textiles.

Test Examples

Infrared Heating Tests

The PET colloidal particles are irradiated at 23° C. with an infrared lamp (Philips PA 38 I Red 150W 125-130V, wavelength range 600 to 1400 nm) at a distance 17 cm between them for 55 minutes, and an infrared thermometer is used to measure the temperature of the $PET_{CB}$ of the above comparative application example 1 and the PET colloidal particles of application example 1 every 5 minutes, respectively, and the results are shown in Table 4 below.

TABLE 4

| No. of PET Colloidal particles | Irradiation time (minutes) | | | | | | | | | | |
|---|---|---|---|---|---|---|---|---|---|---|---|
| | 5 | 10 | 15 | 20 | 25 | 30 | 35 | 40 | 45 | 50 | 55 |
| | Colloidal particle temperature (° C.) | | | | | | | | | | |
| CB | 68 | >100 | >100 | >100 | >100 | >100 | >100 | >100 | >100 | >100 | >100 |
| A1 | 62 | 66 | 68 | 71 | 72 | 72 | 72 | 72 | 72 | 72 | 72 |
| A2 | 60 | 65 | 67 | 69 | 70 | 71 | 71 | 71 | 71 | 71 | 71 |
| A3 | 60 | 66 | 68 | 71 | 72 | 72 | 72 | 72 | 72 | 72 | 72 |
| A4 | 61 | 65 | 66 | 69 | 70 | 71 | 71 | 71 | 71 | 71 | 71 |
| A5 | 60 | 65 | 67 | 67 | 69 | 71 | 71 | 71 | 71 | 71 | 71 |
| A6 | 61 | 65 | 66 | 69 | 69 | 70 | 70 | 70 | 70 | 70 | 70 |
| A7 | 60 | 65 | 67 | 67 | 69 | 70 | 70 | 70 | 70 | 70 | 70 |
| A8 | 61 | 65 | 66 | 69 | 70 | 71 | 71 | 71 | 71 | 71 | 71 |
| A9 | 60 | 66 | 68 | 71 | 72 | 72 | 72 | 72 | 72 | 72 | 72 |
| A10 | 61 | 65 | 66 | 69 | 70 | 71 | 71 | 71 | 71 | 71 | 71 |
| A11 | 62 | 66 | 68 | 70 | 71 | 71 | 71 | 71 | 71 | 71 | 71 |
| A12 | 60 | 65 | 67 | 69 | 70 | 71 | 71 | 71 | 71 | 71 | 71 |
| A13 | 61 | 66 | 68 | 71 | 72 | 72 | 72 | 72 | 72 | 72 | 72 |
| A14 | 60 | 65 | 68 | 71 | 72 | 72 | 72 | 72 | 72 | 72 | 72 |
| A15 | 60 | 67 | 69 | 70 | 71 | 71 | 71 | 71 | 71 | 71 | 71 |
| A16 | 61 | 65 | 66 | 69 | 70 | 70 | 70 | 70 | 70 | 70 | 70 |
| A17 | 60 | 65 | 67 | 70 | 71 | 72 | 72 | 72 | 72 | 72 | 72 |
| A18 | 62 | 66 | 68 | 70 | 72 | 72 | 72 | 72 | 72 | 72 | 72 |
| A19 | 61 | 65 | 66 | 69 | 70 | 71 | 71 | 71 | 71 | 71 | 71 |
| A20 | 60 | 65 | 67 | 69 | 70 | 71 | 71 | 71 | 71 | 71 | 71 |

TABLE 4-continued

| No. of PET Colloidal particles | Irradiation time (minutes) | | | | | | | | | | |
|---|---|---|---|---|---|---|---|---|---|---|---|
| | 5 | 10 | 15 | 20 | 25 | 30 | 35 | 40 | 45 | 50 | 55 |
| | Colloidal particle temperature (° C.) | | | | | | | | | | |
| A21 | 61 | 65 | 66 | 69 | 70 | 70 | 70 | 70 | 70 | 70 | 70 |
| A22 | 49 | 58 | 62 | 68 | 68 | 69 | 69 | 69 | 69 | 69 | 69 |
| A23 | 54 | 61 | 63 | 64 | 66 | 68 | 68 | 68 | 68 | 68 | 68 |
| A24 | 61 | 65 | 66 | 69 | 69 | 70 | 70 | 70 | 70 | 70 | 70 |
| A25 | 61 | 66 | 69 | 71 | 72 | 72 | 72 | 72 | 72 | 72 | 72 |
| A26 | 60 | 67 | 69 | 70 | 71 | 72 | 72 | 72 | 72 | 72 | 72 |
| A27 | 62 | 66 | 68 | 70 | 72 | 74 | 74 | 74 | 74 | 74 | 74 |
| A28 | 61 | 67 | 69 | 72 | 73 | 74 | 74 | 74 | 74 | 74 | 74 |
| A29 | 60 | 66 | 68 | 70 | 72 | 73 | 73 | 73 | 73 | 73 | 73 |
| A30 | 61 | 66 | 68 | 70 | 72 | 73 | 73 | 73 | 73 | 73 | 73 |
| A31 | 62 | 66 | 68 | 71 | 73 | 74 | 74 | 74 | 74 | 74 | 74 |
| A32 | 61 | 66 | 69 | 71 | 72 | 73 | 73 | 73 | 73 | 73 | 73 |

The infrared heating test results of Table 4 show that the temperature of $PET_{A1-A32}$ prepared by using the color masterbatch composition of the disclosure is below 67° C. after 10 minutes of infrared absorption and below 74° C. after 55 minutes of infrared absorption, while the temperature of the carbon black PET colloidal particle $PET_{CB}$ prepared by carbon black has already been higher than 100° C. after 10 minutes of infrared absorption, which indicates that the heating rate is faster and the temperature rise is larger.

In addition, the heating test results of $PET_{B1\ to\ B32}$, $PET_{C1\ to\ C32}$ and $PET_{D1\ to\ D32}$ were similar to those of $PET_{A1\ to\ A32}$, respectively. The above experimental results show that the color masterbatch composition of the disclosure can slow down and reduce the heating effect caused by infrared absorption.

In summary, the color masterbatch composition of the present disclosure can slow down and reduce the temperature rise effect caused by absorbing infrared rays without additionally adding other heat dissipating materials or modifying, and Its original color can still be maintained during the processing of preparing fibers or plastics such that it is suitable for the preparation of dark textiles or engineering plastics, so it is indeed possible to achieve the objects of the present invention.

The above is only the embodiments of the present invention, and the scope of the present invention is not limited thereto, that is, the simple equivalent changes and modifications made in the claims and the description of the present invention still fall in the scope of the present invention.

I claim:

1. A color masterbatch composition, wherein it comprises:
    thermoplastic polyester;
    a yellow colorant component, selected from a group constituted by pigment yellow 147, pigment yellow 181, pigment yellow 183, dye brown 53 and a combination thereof;
    a red colorant component, selected from a group constituted by pigment red 122, pigment red 144, pigment red 202, pigment red 214 and a combination thereof; and
    a blue colorant component, selected from pigment blue 60, dye blue 67 and a combination thereof, said colorants being expressed according to color index common names;
    wherein the total weight of said color masterbatch composition is 100 wt %, the content of said yellow colorant component ranges from 7 wt % to 15 wt %, the content of said red colorant component ranges from 8 wt % to 15 wt %, and the content of said blue colorant component ranges from 5 wt % to 15 wt %; and
    wherein with the total weight of said color masterbatch composition being 100 wt %, said yellow colorant component is dye brown 53 with content ranging from 7 wt % to 10 wt %.

2. The composition according to claim 1, further comprising titanium dioxide, with the total weight of said color masterbatch composition being 100 wt %, and the content of said titanium dioxide ranges from more than 0 wt % to 5 wt %.

3. The composition according to claim 1, wherein said thermoplastic polyester is selected from a group constituted by polyethylene terephthalate (PET), polybutylene terephthalate (PBT), functionalized derivatives of PET, functionalized derivatives of PBT, copolymers thereof, or blends thereof.

4. The composition according to claim 1, wherein with the total weight of said color masterbatch composition being 100 wt %, said blue colorant component is dye blue 67 with content ranging from 5 wt % to 10 wt %.

* * * * *